March 10, 1959 W. W. DODGE ET AL 2,877,081
CARD POSITIONING MEANS
Filed Nov. 5, 1956 3 Sheets-Sheet 1

*INVENTOR.*
WILLIAM W. DODGE
OSCAR L. HIBBARD
*BY*
Robert E. Sandt
AGENT

March 10, 1959 W. W. DODGE ET AL 2,877,081

CARD POSITIONING MEANS

Filed Nov. 5, 1956 3 Sheets-Sheet 3

United States Patent Office 2,877,081

Patented Mar. 10, 1959

2,877,081

CARD POSITIONING MEANS

William W. Dodge, Binghamton, and Oscar L. Hibbard, Johnson City, N. Y., assignors to International Business Machines Corporation, New York, N. Y., a corporation of New York Application November 5, 1956, Serial No. 620,493

2 Claims. (Cl. 346—85)

This invention relates to time recording machines wherein time is recorded on successive areas of discrete record cards inserted therein, and more specifically it relates to an improved card positioning means for detecting the presence of a locating hole in the card and arresting the card in a position in accordance with the location of the hole in the card.

The present invention finds particular application in a sequential time recorder such as that shown in the Sprecker Patent 2,645,551, wherein time is recorded upon a card, and a hole punched indicative of the position of the time record on the card. In the present invention the record card is inserted manually into the machine wherein its feeding is assumed by the feeding means which takes the card from the operator's control and feeds it through the machine to a stacker mechanism, rather than returning it to the hand of the operator as is done in the referenced patent. The structure for locating the record area upon the card is, however, applicable to both types of machines.

It is therefore an object of this invention to provide a card registering means wherein the presence of the card within the machine is detected so as to enable a card feeling mechanism to scan the card for the presence of a registering hole and, having found such hole, to be engaged thereby for movement with the card to a predetermined position where structure is provided to initiate the recording operation upon the card, following which the registering mechanism is retracted to permit the card to be fed out of the machine.

A further object of this invention is to provide an improved time recorder wherein the sequential operation of the instrumentalities therein is assured.

Other objects of the invention will be pointed out in the following description and claims and illustrated in the accompanying drawings, which disclose, by way of example, the principle of the invention and the best mode which has been contemplated of applying that principle.

Figures 1, 2:
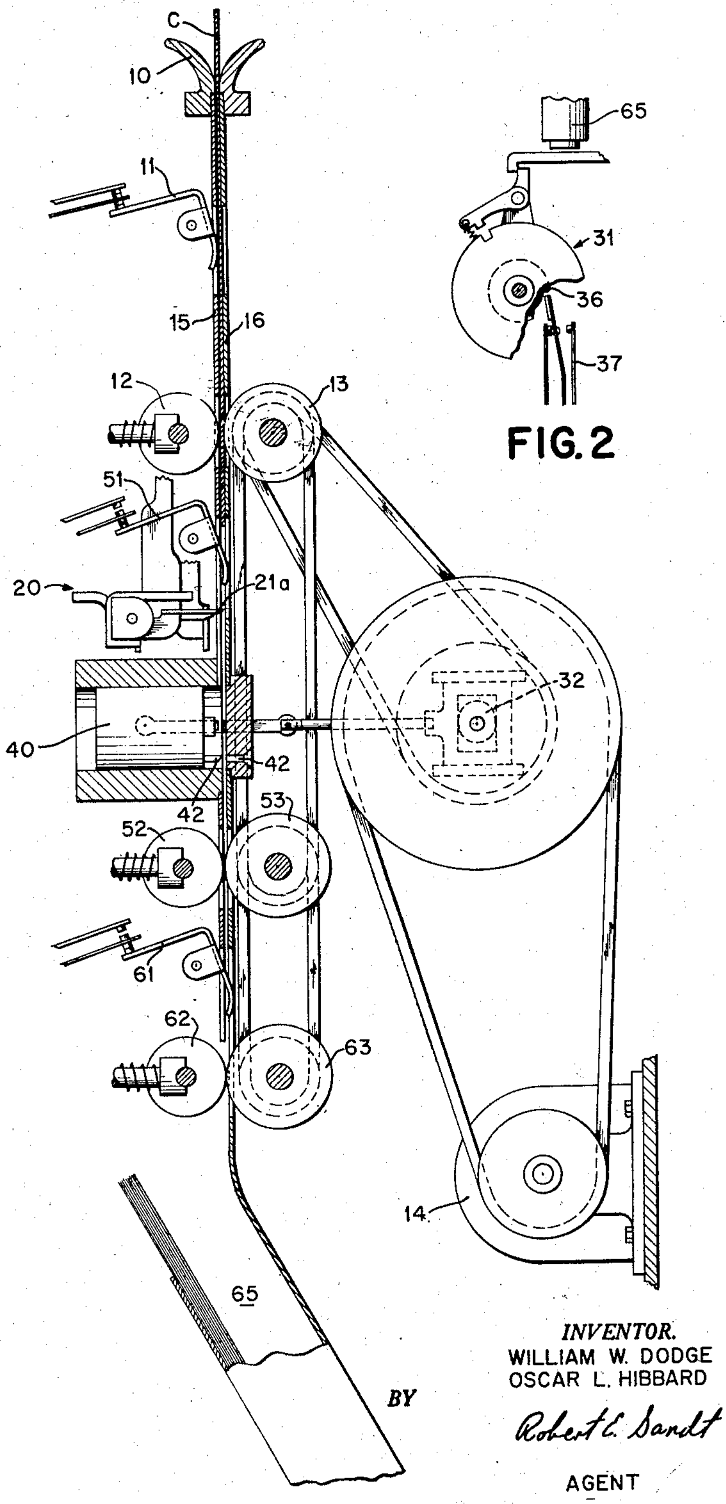
Fig. 1 is a schematic sectional view of the machine showing the general orientation of the parts.
Fig. 2 is a detail of the drive structure of the machine.

Referring to Fig. 1, a card receiver 10 is located at the top of the machine to permit manual insertion of the card by the workman. Directly beneath the card receiver, and responsive to the insertion of the card therein, is a card lever 11 of conventional construction, which card lever, upon the presence of a card, operates to close electrical contacts whose detailed function will be hereinafter described in that section devoted to the electrical circuitry, but for the present purposes it will suffice that closure of these contacts energize the drive motor 14. Located beneath card lever 11, and generally in the path of the feed of the card, are paired feed rolls 12 and 13, which rolls are driven through a belt drive from a suitable electric motor 14. The feed of the card through the machine is generally guided by spaced parallel plates 15 and 16 through which the above rolls 12 and 13 and other paired feed rolls 52, 53, 62, 63 extend, each pair of feed rolls being spaced no more than a card length from the preceding pair so as to insure a continuous feed of the card. All of the above rolls are skid rolls wherein the pressure against the card is just sufficient to move the card if it be uninhibited. These plates are provided with internal guides therebetween so that the card, in its passage through the machine, is accurately aligned at all times. With the structure thus described it will be seen that a card once inserted into the card receiver 10 and pushed into the bite of the feed rolls 12 and 13 will be propelled thereby downwardly between the guides 15 and 16, and successively into the bite of the paired rolls 52, 53, and thence to the paired rolls 62 and 63 and out of the machine to the stacker 65. During downward travel of the card the card lever 11 will be actuated. Similarly, card levers 51 and 61 will be actuated by the passage of the card, these card levers being spaced from one another by no more than a card length so that at least one of these contacts (11, 51, 61) is closed at all times during the presence of a card in the machine. Thus, but for the presence of a card arresting mechanism, generally referred to as 20 and located after the feed rolls 12 and 13, a card once inserted into the machine would be passed therethrough without interruption.

Figures 3, 4, 5, 6, 7:
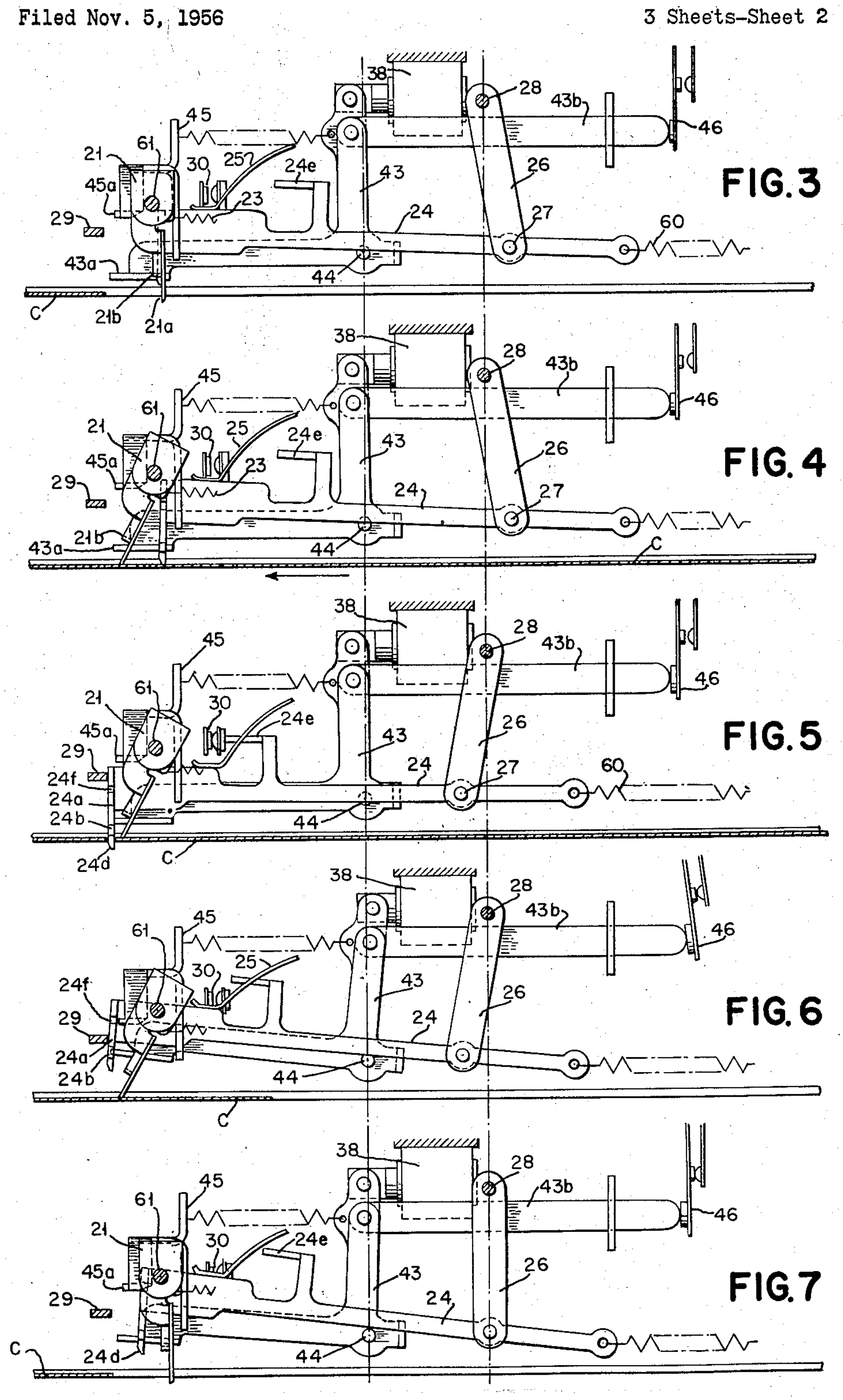
Figs. 3–7 show the card arresting mechanism in its sequential operating positions.
Figure 8:
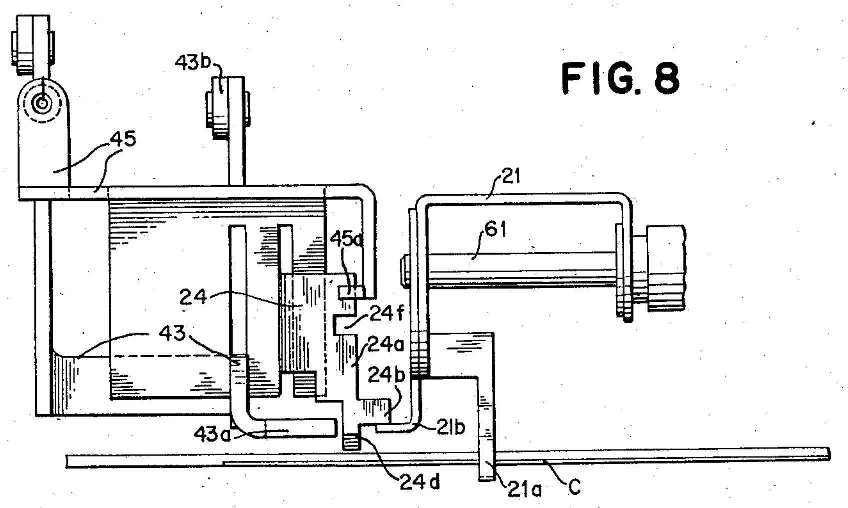
Fig. 8 is a detailed end view of the card arresting mechanism as viewed from the left of Fig. 3.

Referring now to Figs. 3–7 wherein is shown the detailed and sequential operation of the card arresting mechanism 20, one will observe that these views have been rotated 90° with respect to Fig. 1 for the purpose of drawing clarity. As viewed in these figures, the feed of the card is from right to left. In Fig. 3 the structure 20 is shown in the retracted or reset position with the preceding card C having passed to the left out of coaction therewith. In this position of the mechanism the hole sensing lever 24 pinned at 27 to a link 26, which in turn is pivoted to fixed structure at 28, is drawn to the right by spring 60, and is held upwardly against the resilience of leaf spring 25 by a latch member 21 pivoted at 61 to fixed structure. The hole sensing member 24 has a forwardly turned flange 24*a* (see Fig. 8), which flange has a protuberance 24*b* thereon extending forwardly as viewed in Fig. 3, or to the right as viewed in Fig. 8. This protuberance 24*b* rests on top of a corresponding protuberance 21*b* on the latch member 21, so that the hole sensing member 24 is held in its upward position.

Upon insertion of a new card in the machine and the feed therethrough, the leading edge of the card hits depending tail 21*a* of latch member 21 to rock it in a clockwise direction against the resilience of spring 23 so as to remove the protuberance 21*b* thereon from beneath the corresponding protuberance 24*b* on the hole sensing member 24 to release the member 24 which is urged by spring 25 into coaction with the card C, so that the parts occupy the position shown in Fig. 4.

Further feeding of the card C will bring a hole therein beneath a pinlike extension 24*d* of the flange 24*a* to permit said extension 24*d* to pass through said hole under urging of the spring 25, so that further feeding of the card will carry the hole sensing lever therewith from right to left, as viewed in the figures here under consideration. This movement is permitted through the linkage and pivots 26, 27 and 28 hereinabove described, but can proceed only until the member 24 coacts with a fixed stop 29 to arrest both the member and the card. At the same time that the member 24 is thus arrested, an extension 24*e* thereof closes contacts 30 so that the parts now occupy a position as shown in Fig. 5. The contacts 30 initiate a recording cycle which, upon its completion, effects the energization of the solenoid 38 to move its armature to the right, as viewed in these figures.

Loosely connected to the armature of the solenoid 38, and operable thereby, is a bifurcated bell crank 43 pivoted at 44 and having a forwardly turned flange 43a as viewed in Figs. 3–7 (to the right as viewed in Fig. 8), which flange underlies the member 24. Thus, energization of the solenoid 38 effects a clockwise rocking of the bell crank 43 and, due to its underlying member 24, a corresponding movement thereof. The forwardly turned flange of the hole sensing lever 24 is provided with a slot 24f, which slot will pass a rearwardly turned flange 45a of a fixed comb 45. Thus, the member 24 is first raised from the card into a position as shown in Fig. 6, wherein the slot 24f is about to pass over the flange 45a under the urging of spring 60. It will be observed that in this position, as shown in Fig. 6, the card is no longer restrained and is fed by the action of the skid rolls. However, the trailing edge of the card has still maintained the latch 21 in its rocked or unlatched position. Therefore, a momentary energization of the solenoid 38 is insufficient to permit the latch 21 to be restored to its latched position in time to receive the member 24. To obviate this difficulty there is provided on a second bifurcation of the bell crank 43, a push-rod 43b which closes contacts 46 to provide a self-holding circuit for the solenoid 38. Upon the expulsion of the card C from the machine all of the card levers 11, 51 and 61 will be opened and the self-holding circuit to the solenoid 38 will be broken to permit the member 24 to be released through the medium of bell crank 43 into coaction with the latch 21, preparatory to the entry of a new card. Thus, the parts are returned to the position shown in Fig. 3.

During the period of the interruption of the card feed by the card arresting mechanism 20, closure of the contacts 30 will energize the magnet of a one-revolution clutch 31 (Fig. 1) of conventional construction, which clutch engages the motor-driven shaft with the eccentric shaft 32 for a single revolution of the latter shaft. Through a connecting rod structure, a recording element 40 is caused to be reciprocated toward the card C to effect a record thereon. This recording element may either be a time printing element of the type shown in the above-identified patent to Sprecker, or a variably settable punch of the type shown in the Bryce Patent 1,190,217. In either case there is impressed on the card indicia, either printed or perforated, representative of the time of insertion of the card into the machine. At the same time that the time recording is effected by the recording mechanism 40, a suitable punch and die structure 42 and 42a respectively reciprocated by the same structure for operating the recorder, punches a new registering hole, so that for a subsequent entry of the card in the machine a new recording area will be selected on the card. Thus a card with a prepunched registering hole when inserted into the machine will receive a first time impression and a second registering hole, and for each subsequent insertion will receive a time impression and a registering hole until the card area is exhausted. Should a blank card or an improperly inserted card be inserted, it will be passed through the machine without recording.

Following the recording and punching operation hereinabove described, and just prior to the end of the rotation of the eccentric shaft 32 and the latching up of the clutch 31, a cam 36 on the shaft 32 transfers contacts 37 momentarily to energize the solenoid 38 for the purpose previously described.

Figure 9:
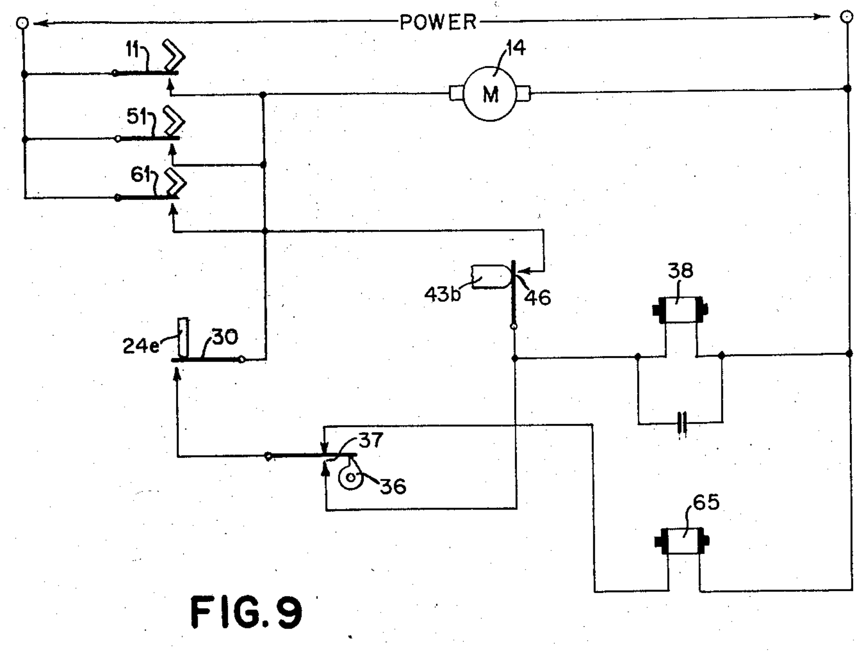
Fig. 9 is an electrical wiring diagram of the machine.

With reference to Fig. 9 wherein the electrical interconnection of the parts of the machine is shown, power is supplied on the two lines labeled "power." The card levers 11, 51 and 61, closed sequentially by the passage of the card through the machine, provide running power for the motor 14 so long as a card is in the machine. The same card lever contacts (11, 51 and 61) will, upon closure of contacts 30 by movement of the arresting lever with the card, pass an energizing current through the normally closed contacts of the contact set 37 to energize the clutch magnet 65 to effect a single revolution of the eccentric shaft and the cam 36, so as to transfer the contacts 37 momentarily just before the end of the single revolution. This transfer of the contacts provides an energizing circuit for the restoring solenoid 38 and breaks the energizing circuit for clutch magnet 65. Paralleled with the restoring solenoid 38 is a condenser to delay the deenergization thereof until the pushrod 43b has an opportunity to move and close contacts 46 to provide a stick circuit for the solenoid through the card lever contacts 11, 51 or 61. Retraction of the sensing lever 24 opens contacts 30 to prevent reenergization of the clutch magnet 65, and also permits the card to be fed out of the machine, whereupon the last card lever 61 is opened and the circuit to the motor 14 broken, so that the motor can coast to a stop to feed the card out of the machine.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a time recording machine for recording on successive areas of a discrete card record having a locating hole therein, card feeding means adapted to receive a manually inserted record card and feed it along a controlled path through the machine; recording means adapted to impress a time record on the card as well as a perforation indicative of the position at which the time record is made on the card, a card arresting lever normally biased for coaction with said card and having a sensing finger for detecting a previously made perforation, a latch coacting with said card arresting lever to hold said lever out of the path of said card and having a portion thereof adapted to be engaged by said card to unlatch said arresting lever to permit its movement into coaction with the card whereby the said sensing finger passes into the perforation in said card; means mounting said arresting lever and adapted to permit the card to move said arresting lever to a predetermined stop position; means controlled by said arresting lever when in the stop position for initiating an operation of the recording means; and means responsive to the completion of the recording operation for withdrawing said arresting lever from said card and for resetting same to its latched condition.

2. A card arresting mechanism for arresting a card having a locating hole therein and moved relative to the arresting mechanism comprising, a lever having a hole-engaging pin integral therewith; means mounting said lever for movement of said pin tangentially of said card; further means urging said lever in a direction normal to the said card contra to the relative movement thereof; latch means coacting with said lever to hold said pin out of engagement with said card and having a portion thereof adapted to be engaged by said card to move said latch to release said lever to permit said pin to engage the surface of said card until, by the relative movement of the card, the hole is presented to the pin whereby the pin enters the hole so as to carry the pin with the card; stop means for arresting the normal movement of the said lever; and means controlled by said lever when in the stopped position for resetting said lever and said latch.

References Cited in the file of this patent

UNITED STATES PATENTS

| | | |
|---|---|---|
| 2,172,329 | Bryce | Sept. 5, 1939 |
| 2,421,697 | Hobby | June 3, 1947 |
| 2,645,551 | Sprecker | July 14, 1953 |